(12) United States Patent
Goossens

(10) Patent No.: US 8,830,226 B2
(45) Date of Patent: Sep. 9, 2014

(54) SYSTEMS, METHODS, AND COMPUTER-READABLE MEDIA FOR INTEGRATING A THREE-DIMENSIONAL ASSET WITH A THREE-DIMENSIONAL MODEL

(75) Inventor: Thomas Goossens, Paris (FR)

(73) Assignee: Apple Inc., Cupertino, CA (US)

( * ) Notice: Subject to any disclaimer, the term of this patent is extended or adjusted under 35 U.S.C. 154(b) by 972 days.

(21) Appl. No.: 12/892,643

(22) Filed: Sep. 28, 2010

(65) Prior Publication Data

US 2012/0079378 A1 Mar. 29, 2012

(51) Int. Cl.
*G06T 15/00* (2011.01)

(52) U.S. Cl.
USPC .......................................... 345/419; 345/420

(58) Field of Classification Search
CPC .......... G06T 15/00; G06T 17/00; G06T 19/20
See application file for complete search history.

(56) References Cited

U.S. PATENT DOCUMENTS

| | | | | |
|---|---|---|---|---|
| 5,825,365 | A * | 10/1998 | Hirota et al. | 345/678 |
| 6,448,964 | B1 * | 9/2002 | Isaacs et al. | 345/419 |
| 6,989,830 | B2 * | 1/2006 | Stollnitz et al. | 345/420 |
| 7,277,572 | B2 | 10/2007 | MacInnes et al. | |
| 7,336,264 | B2 | 2/2008 | Cajolet et al. | |
| 7,388,580 | B2 * | 6/2008 | Birdwell | 345/420 |
| 7,589,720 | B2 * | 9/2009 | Zhou et al. | 345/423 |
| 2008/0122840 | A1 | 5/2008 | Falco | |
| 2009/0160856 | A1 | 6/2009 | Hoguet | |

OTHER PUBLICATIONS

Sharf, Andrei, et al. "SnapPaste: an interactive technique for easy mesh composition." The Visual Computer 22.9-11 (2006): 835-844.*
Kreavoy, Vladislav, Dan Julius, and Alla Sheffer. "Model composition from interchangeable components." Computer Graphics and Applications, 2007. PG'07. 15th Pacific Conference on. IEEE, 2007.*
Lin, Juncong, et al. "Mesh composition on models with arbitrary boundary topology." Visualization and Computer Graphics, IEEE Transactions on 14.3 (2008): 653-665.*
Lin, Juncong, Xiaogang Jin, and Charlie CL Wang. "Fusion of disconnected mesh components with branching shapes." The Visual Computer 26.6-8 (Apr. 14, 2010): 1017-1025.*

* cited by examiner

*Primary Examiner* — Hau Nguyen
*Assistant Examiner* — Ryan M Gray
(74) *Attorney, Agent, or Firm* — Schwegman Lundberg & Woessner, P.A.

(57) ABSTRACT

Systems, methods, and computer-readable media are provided for integrating a three-dimensional asset with a three-dimensional model. Each asset can include a base surface and either a protrusion or a projection extending from the base. Once the asset is placed at a particular position with respect to the model, one or more vertices defining a periphery of the base surface can be projected onto an external surface of the model. Then, one or more portions of the asset can be deformed to provide a smooth transition between the external surface of the asset and the external surface of the model. In some cases, the asset can include a hole extending through the external surface of the model for defining a cavity. A secondary asset can be placed in the cavity such as, for example, an eyeball asset placed in an eye socket asset.

16 Claims, 13 Drawing Sheets

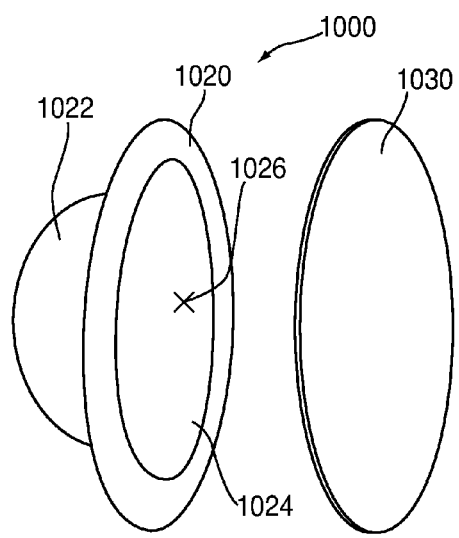
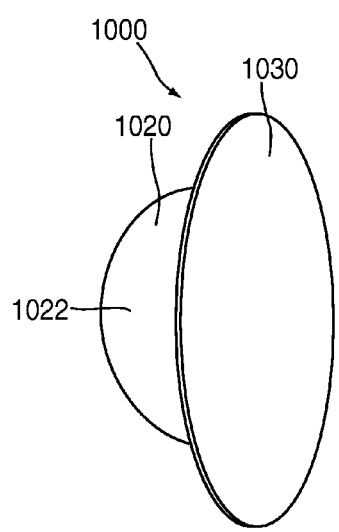
FIG. 10  FIG. 11
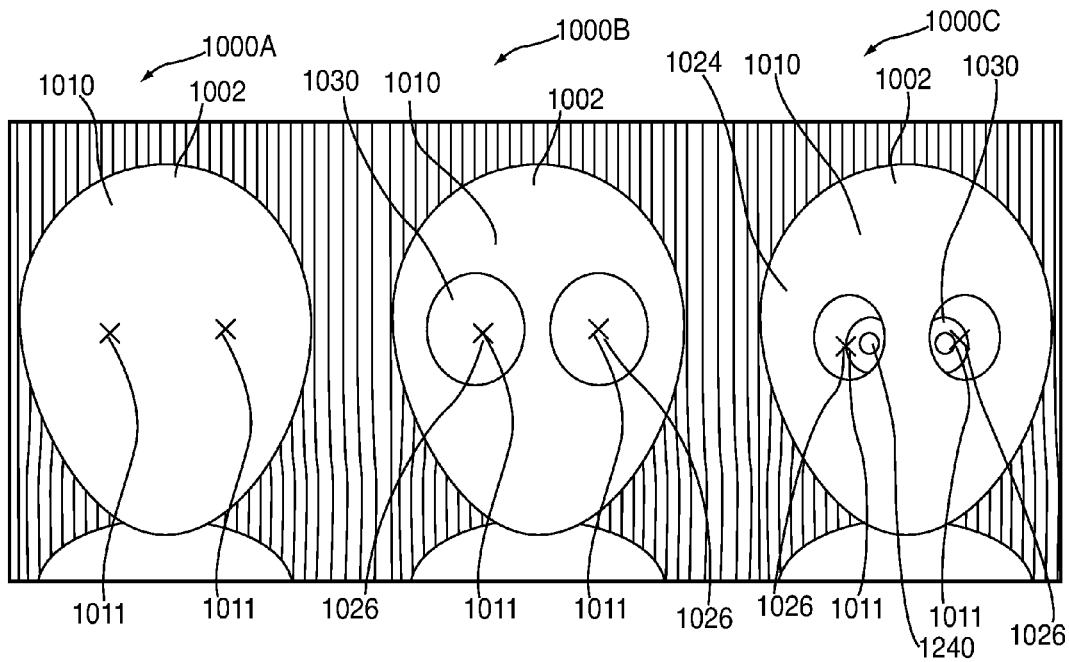
FIG. 12A  FIG. 12B  FIG. 12C

SYSTEMS, METHODS, AND COMPUTER-READABLE MEDIA FOR INTEGRATING A THREE-DIMENSIONAL ASSET WITH A THREE-DIMENSIONAL MODEL

BACKGROUND

Some electronic devices can display three-dimensional models that a user can control as part of an electronic device operation. For example, gaming consoles can display three-dimensional avatars that represent a user, and the user can direct the avatar to perform specific actions in a game. The three-dimensional models can be constructed from the combination of several assets such as a body, head, eyes, ears, nose, hair, glasses, hat, or other accessories. The assets can be placed adjacent to the external surface of the model. To enhance the user's experience, the user can personalize a displayed model by selecting and moving specific assets with respect to the remainder of the model.

SUMMARY

Systems, methods, and computer-readable media for integrating a three-dimensional asset with a three-dimensional model are provided.

An electronic device can display a three-dimensional model (e.g., an avatar) that may be constructed from several assets. For example, assets corresponding to facial features can be integrated into an external surface of a head asset or base structure of a model. Each asset can be incorporated in the model in a manner that may ensure that the asset is seamlessly integrated with an external surface of the model. When a user moves an asset with respect to the remainder of the model, for example, by dragging the asset, the asset can move in a manner that maintains a seamless integration of the asset with the external surface of the model.

The asset can include a pivot point and a base surface. The pivot point can define a point of the asset that may have a consistent positional relationship with respect to any particular contact point along an external surface of a model with which the asset is to be integrated. The base can define a surface from which a protrusion or hole portion of the asset can extend. The periphery of the base surface can be defined as a sequence of vertices forming a closed path. When a user provides an instruction to place an asset on a model, a particular contact point on the external surface of the model that corresponds to the user-provided instruction may be identified, and the asset can be placed with respect to the model such that the asset's pivot point coincides with the identified contact point. Then, one or more vertices of the base periphery can be projected onto the external surface of the model to ensure that the base periphery of the asset is entirely in contact with the external surface of the model.

To ensure that the asset appears to be seamlessly integrated with the remainder of the model, a portion of the asset may be modified in the vicinity of the projected vertices. In particular, a region of an external surface of the asset can be re-defined such that the external surface of the asset may transition smoothly to the external surface of the remainder of the model adjacent the asset. When the asset includes a hole, a portion of the external surface of the model that is within an area of the asset's base periphery may be removed such that an interior cavity of the hole can be exposed.

BRIEF DESCRIPTION OF THE DRAWINGS

The above and other aspects of the invention, its nature, and various features will be more apparent upon consideration of the following detailed description, taken in conjunction with the accompanying drawings in which like reference characters may refer to like parts, and in which:

FIG. 10 is an exploded perspective view of a three-dimensional hole asset in accordance with some embodiments of the invention;

FIG. 11 is a perspective view, similar to FIG. 10, of the three-dimensional hole asset of FIG. 10, but assembled, in accordance with some embodiments of the invention;

FIGS. 12A-12C are a sequence of illustrative displays showing a three-dimensional hole asset integrated with a three-dimensional model in accordance with some embodiments of the invention;

DETAILED DESCRIPTION

Systems, methods, and computer-readable media for integrating a three-dimensional asset (e.g., a protrusion asset or a hole asset) with a three-dimensional model are provided and described with reference to FIGS. 1-19.

A three-dimensional model may be displayed to an artist of the model or an end user of the model. The model can be customized by integrating assets with an external surface of the model. A user can select a particular point on the model for disposing an asset by selecting a contact point on an external surface of the model. The contact point can include a single point on the external surface of the model at which a pivot point of the asset is to be placed. A periphery of a base surface of the asset can be projected onto the external surface of the model to ensure that the asset may be smoothly integrated with the model.

In some cases, a region of the asset (e.g., a region of the asset that is adjacent to the projected base of the asset) can be changed, re-defined, re-drawn, smoother, or otherwise deformed so that the asset may have a seamless transition with the remainder of the model. In particular, this may be significant if the pivot point of the asset is located on the external surface of the model such that the base surface of the asset is initially within a volume enclosed by the model (e.g., such that the base surface is underneath the external surface of the model). If the asset includes a hole, the portion of the external surface of the model that is within the area enclosed by the base surface once the base surface has been projected onto the external surface of the model can be removed to create an opening for exposing a cavity that may be defined by an interior surface of the asset's hole. In some cases, a secondary asset can be placed in such a hole asset (e.g., an eyeball asset can be placed in a cavity of an eye socket hole asset to create a combined eye asset).

Figure 1:
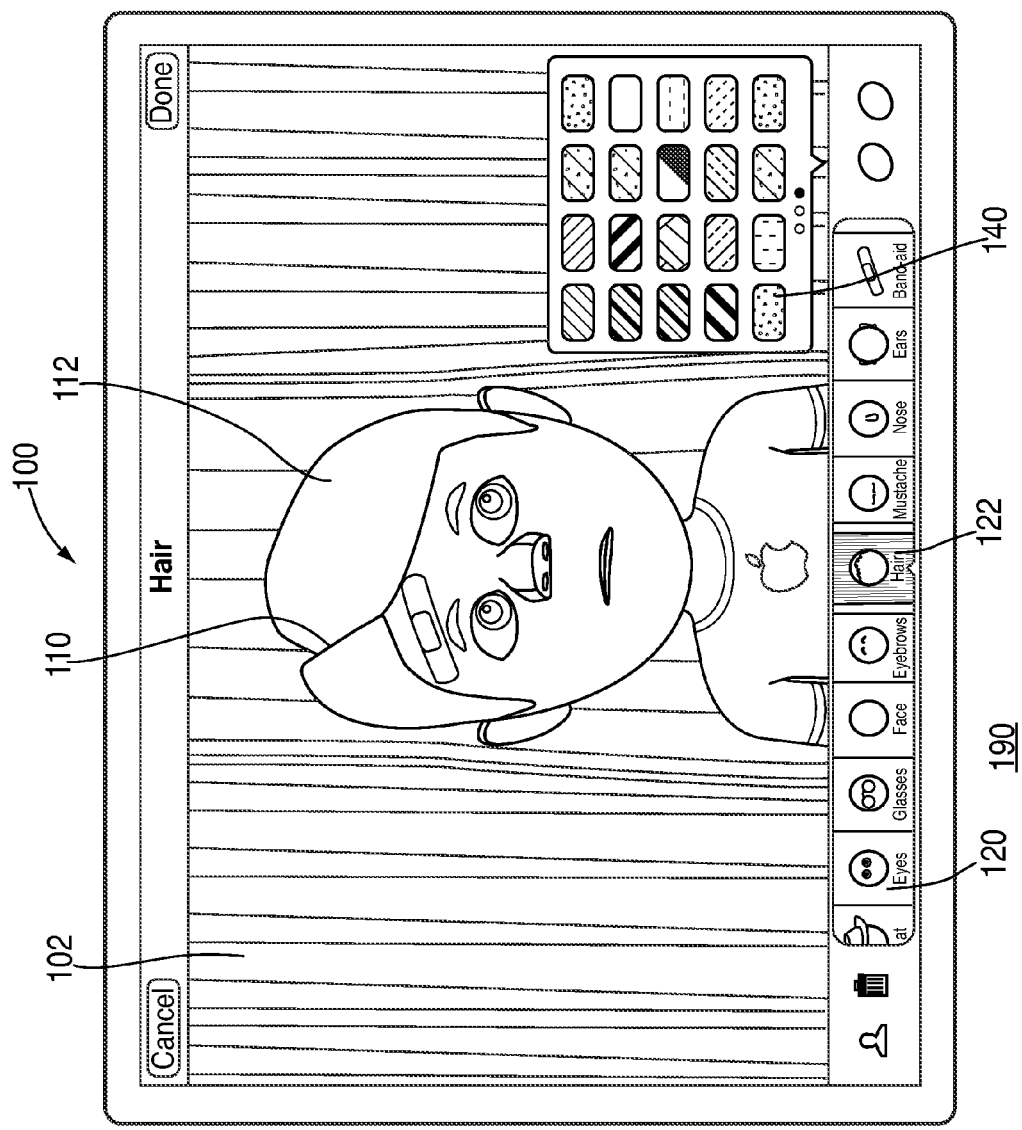
FIG. 1 is an illustrative display of a three-dimensional model displayed by an electronic device in accordance with some embodiments of the invention.

An electronic device can display different content for enjoyment by a user. In some cases, an electronic device can display a three-dimensional model as part of an application operating on the device. FIG. 1 is an illustrative display 100 of an electronic device 190 for displaying a three-dimensional model in accordance with some embodiments of the invention. Display 100 can include a model 110 that may be provided in front of a background 102. Model 110 can represent any suitable object including, for example, a person, an animal, a place, or a thing (e.g., an imaginary being). In some cases, model 110 can include an avatar. A user can create model 110 by selecting assets from asset bar 120, and positioning specific assets on the model. The assets can include, for example, a face, mouth, eyes, ears, nose, mustache, beard, hair, eyebrows, glasses, hats, accessories (e.g., jewelry or band-aids), clothing, or other components that can be included on or integrated with a model. The assets can be provided from a source of assets (e.g., a library of assets that may be stored locally on or remotely from electronic device 190).

When a user selects an asset type on asset bar 120 such as, for example, hair asset type 122, device 190 can display a menu or listing of one or more different hair options (not shown). The user can select one of the hair options to be applied to the model (e.g., as hair asset 112). A user can select any suitable number of options associated with a single asset to place on a model (e.g., asset size, shape, style, etc.). For example, a user can select different colors for an asset. As shown in FIG. 1, to change a color of hair asset 112, a user can select one of the color options provided by color menu 140 of asset bar 120.

Figure 2A:
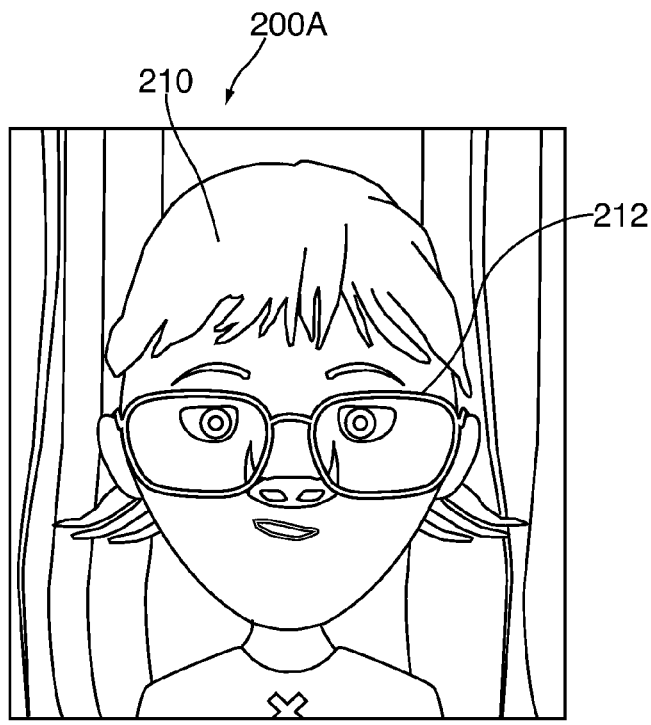
FIGS. 2A and 2B are illustrative displays of an asset placed at different regions on a three-dimensional model in accordance with some embodiments of the invention.
Figure 2B:
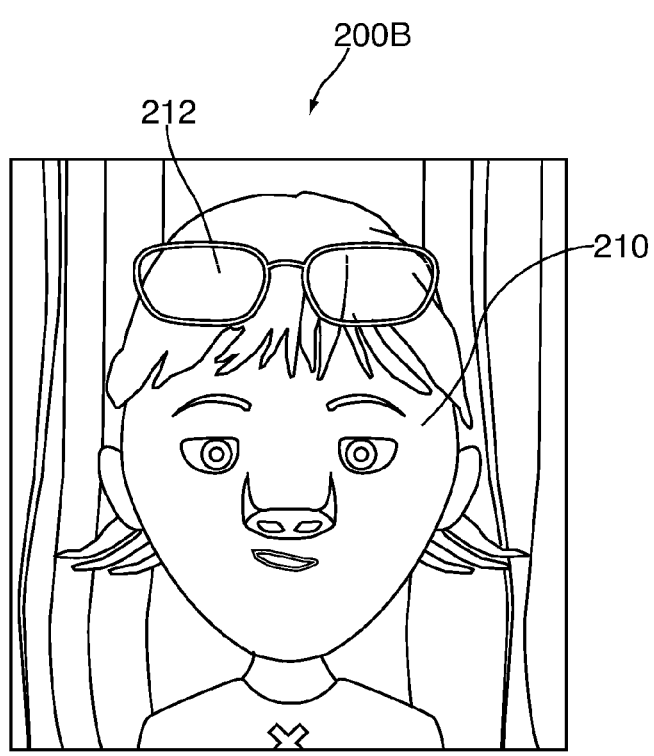

In some embodiments, a user can customize a model by moving an asset to different placements with respect to the rest of the model. In the example of FIGS. 2A and 2B, respective displays 200A and 200B of model 210 can include glasses asset 212 in two different placements (e.g., on the bridge of the nose of model 210 of FIG. 2A, and on the forehead of model 210 of FIG. 2B). The user can move asset 212 using any suitable approach including, for example, by dragging asset 212 with respect to model 210, or by using directional instructions (e.g., directional keys of an input interface).

Figure 3A:
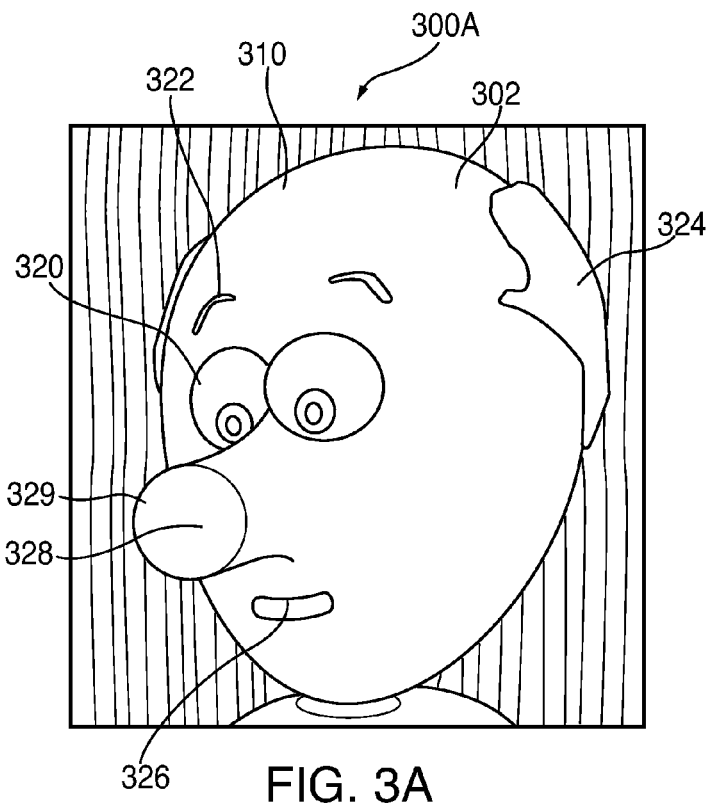
FIGS. 3A and 3B are illustrative displays of a three-dimensional model with an integrated asset in accordance with some embodiments of the invention.
Figure 3B:
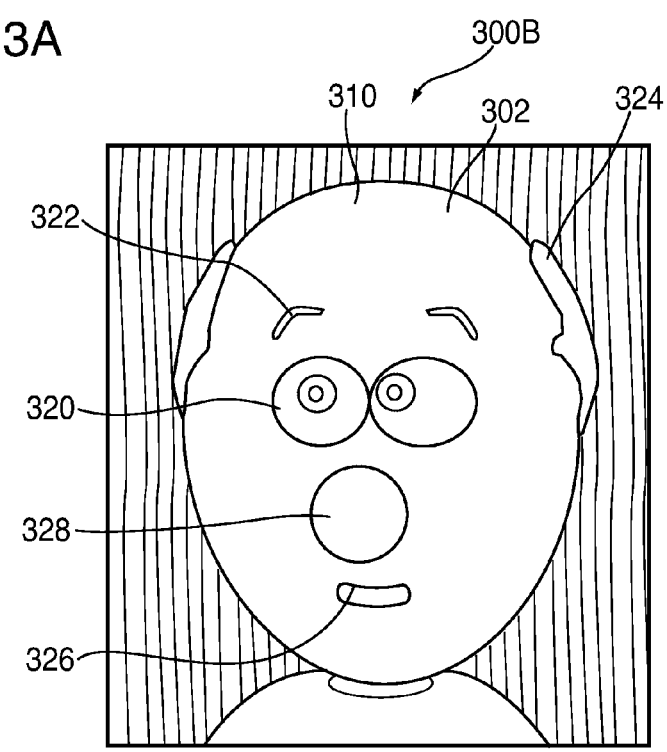

Some types of assets can be integrated with an external surface of a three-dimensional model instead of being positioned on or adjacent to the external surface. For example, assets corresponding to noses, ears, eyes, or other facial features of an avatar can be integrated with a surface of the avatar. FIGS. 3A and 3B are respective views 300A and 300B of a three-dimensional model 300 having an integrated asset in accordance with some embodiments of the invention. Model 300 can include a foundation structure 302 having an external surface 310 with which different assets may be integrated. In some cases, foundation structure 302 can itself be a type of asset. Foundation structure 302 can serve as a primary object on which assets are added, and can therefore correspond to a body or face for the model. Foundation structure 302 can define any suitable three-dimensional shape including, for example, a sphere, ovoid, cuboid, or polygonal volume. Model 300 can include eyes asset 320, eyebrows asset 322, hair asset 324, mouth asset 326, and nose asset 328 integrated with external surface 310 of foundation structure 302 of model 300. Some assets that are integrated with surface 310 of foundation structure 302 can protrude from surface 310, extend into surface 310 (e.g., creating an opening through surface 310), or both. For example, nose asset 328 can include protrusion 329 extending beyond external surface 310 of foundation structure 302 of model 300.

Figure 4A:
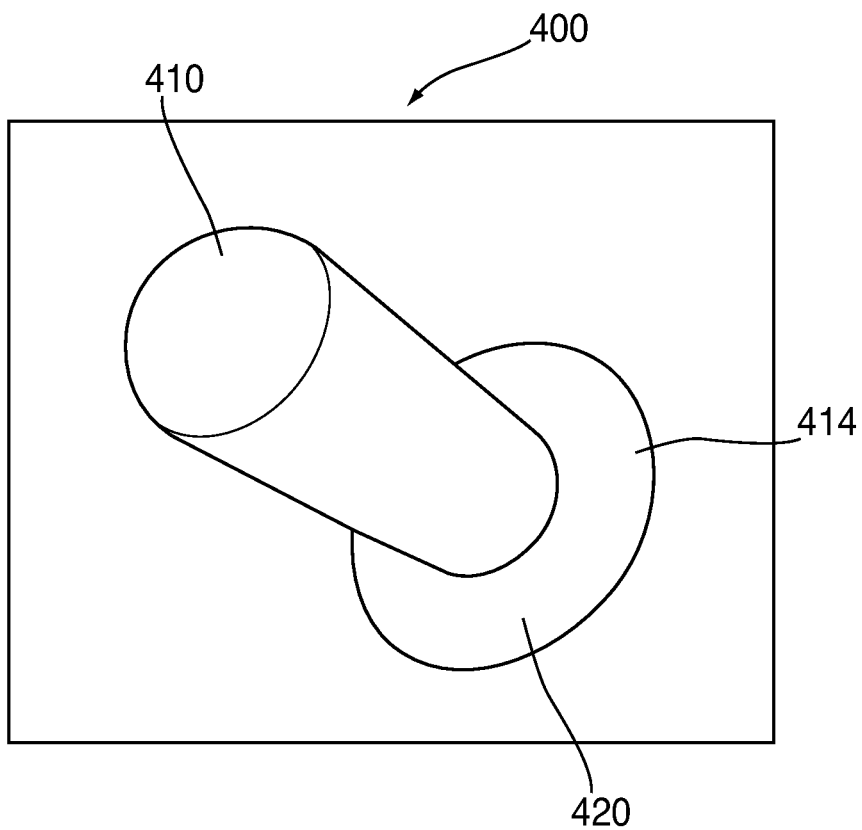
FIGS. 4B and 4A are opposite perspective views of an illustrative three-dimensional protrusion asset in accordance with some embodiments of the invention.
Figure 4B:
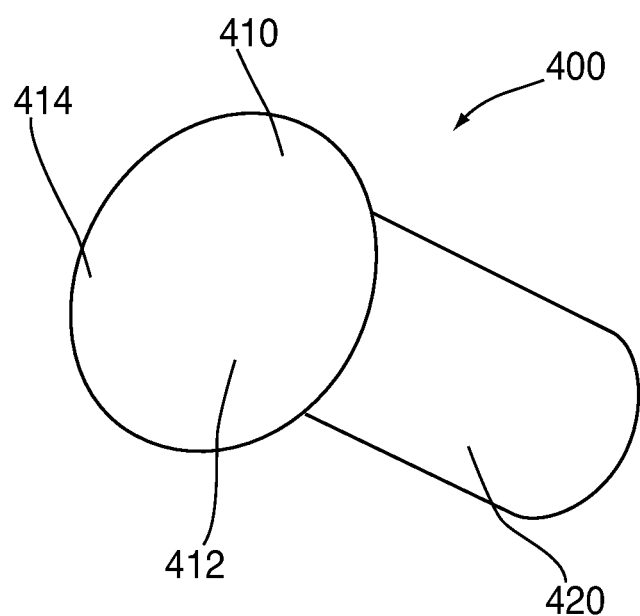

The amount by which an asset may protrude from an external surface of a model, as well as the interface between the asset and the external surface of the model, can be determined from attributes of the asset. FIGS. 4A and 4B are perspective views of an illustrative asset 400 that can be integrated with a three-dimensional model in accordance with some embodiments of the invention. Asset 400 can include protrusion 410 extending from base 412. Base 412 can have any suitable shape including, for example, a shape defining a closed path. In some cases, base 412 can define a circle, oval, square, rectangle, pentagon, polygon, curved shape, or any other suitable shape. The shape of base 412 can be selected based on properties of protrusion 410. For example, if protrusion 410 substantially defines a cylindrical structure, base 412 can define a circle or oval. As another example, if protrusion 410 substantially defines a rectangular or pyramidal structure, base 412 can define a polygon.

Base 412 can be defined using any suitable approach. In some embodiments, base 412 can be defined as a series of vertices or points along a path defining a periphery of base surface 414 of asset 400 that may contact an external surface of a model with which asset 400 is to be integrated In some cases, specific vertices can be selected from the path of base 412 to integrate asset 400 with a three-dimensional model. The vertices of base 412 can be disposed in a single plane or in a three-dimensional space, for example to facilitate the initial creation of asset 400 by an artist.

Protrusion 410 can include any suitable shape extending from base 412. In some cases, protrusion 410 can include a specific shape corresponding to a type of asset. For example, a nose asset can include a more extended protrusion, while an ear asset can include a more compact protrusion. Protrusion 412 can include an external surface 420 having one or more features for providing an aesthetically pleasing asset. In some cases, external surface 420 can have a particular texture or a particular color, for example which may be selected to match a texture or color of an external surface of a three-dimensional model with which asset 400 is to be integrated.

Figure 5:
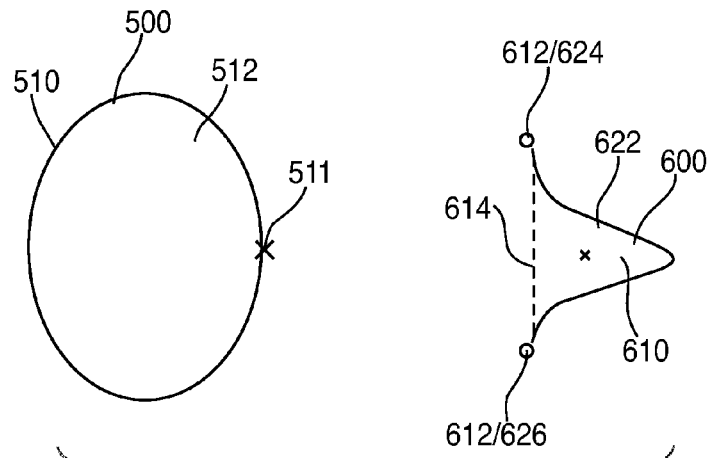
FIG. 5 is a cross-sectional view of an illustrative three-dimensional asset and an illustrative three-dimensional model in accordance with some embodiments of the invention.

In some cases, an asset can include one or more specific features that are used to position and integrate the asset with a three-dimensional model. In particular, a pivot point may be defined to properly position an asset with respect to a model. Moreover, several vertices of a base of an asset (e.g., some or all of the vertices) can be used to incorporate the asset in a model. FIG. 5 is a schematic view of an illustrative three-dimensional model 500 and an illustrative three-dimensional asset 600 that is to be integrated with model 500 in accordance with some embodiments of the invention. Three-dimensional model 500 can include a volume 512 defined by an external surface 510 with which asset 600 can be integrated. In some cases, model 500 can include a foundation structure having no integrated assets. Alternatively, model 500 can include a foundation structure with which one or more assets have been integrated. Asset 600 can include a protrusion 610 and a base 612 of a base surface 614. Base 612 may include vertices 524 and 526, and asset 600 may also include a pivot point 622. Pivot point 622 can include a pre-defined point corresponding to a specific point of asset 600 that is to come into contact with a particular point on external surface 510 of model 500 (e.g., a contact point 511, which may be selected by a user when customizing model 500). Pivot point 622 can remain fixed relative to external surface 511 even as portions of asset 600 are deformed. In some cases, pivot point 622 can be selected as a point within a volume enclosed by asset 600 (e.g., within a volume defined by base surface 614 and protrusion 610). Pivot point 622 and the vertices of base 612 (e.g., vertices 624 and 626) can be selected by an artist creating asset 600 for later use by a user customizing with a model.

Figure 6:
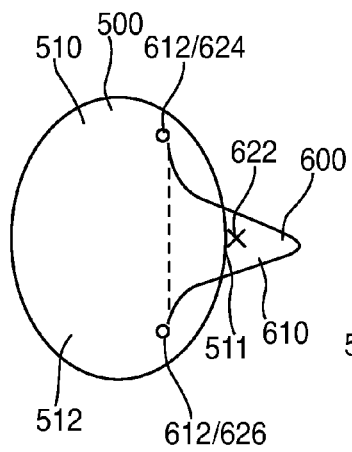
FIG. 6 is a cross-sectional view, similar to FIG. 5, of the asset of FIG. 5 positioned with respect to the model of FIG. 5 in accordance with some embodiments of the invention.

Using the pivot point of an asset, an electronic device can determine how to position the asset with respect to a model. FIG. 6 is a schematic view of asset 600 positioned with respect to model 500 in accordance with some embodiments of the invention. Asset 600 can be positioned such that pivot point 622 is placed at a particular position on external surface 510 of model 500. Pivot point 622 can be placed on any suitable portion of external surface 510 including, for example, such that pivot point 622 may be positioned at contact point 511 on external surface 510. In particular, a user can provide an instruction identifying a specific contact point on external surface 510 at which to place pivot point 622. Contact point 511 may correspond to the location of an input provided to an electronic device by a user (e.g., a touch input on a touch surface of a device, or a cursor location on a display of a device).

Based on the position of contact point 511 with respect to the geometry of model 500 and/or based on pivot point 622 of asset 600 with respect to protrusion 610 of asset 600, one or more vertices of base 612 (e.g., vertices 624 and 626, as shown in FIG. 6) may be within volume 512 of model 510. In particular, pivot point 622 can be offset from at least a portion of base 612 such that at least some of the vertices of base 612 (e.g., at least vertices 624 and 626) may be behind external surface 510 of model 500. In some cases, the shape of model 500, and in particular the shape and size of external surface 510 in the vicinity of contact point 511, can determine whether vertices 624 and 626 are within volume 512. For example, when pivot point 622 is offset from base surface 614, the flatter external surface 510, the more likely vertices 624 and 626 will be within volume 512. Conversely, the more curved external surface 510, the more likely one or both of vertices 624 and 626 will be outside of volume 512. As another example, when pivot point 622 is incorporated in base surface 614, the more curved external surface 510, the more likely vertices 624 and 626 will be outside of volume 512. Conversely, the flatter external surface 510, the more likely one or both of vertices 624 and 626 will be inside of volume 512.

Figure 7:
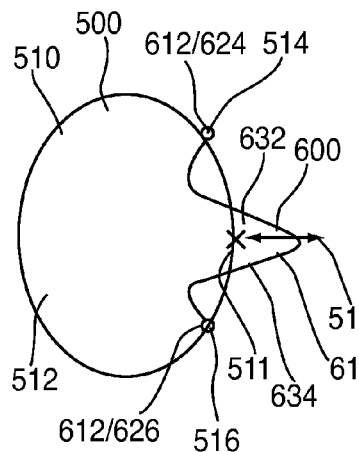
FIG. 7 is a cross-sectional view, similar to FIGS. 5 and 6, of the asset of FIGS. 5 and 6 when it is deformed and positioned partially within the model of FIGS. 5 and 6 in accordance with some embodiments of the invention.

Once a pivot point of an asset has been placed at a selected contact point on an external surface of a model, the asset may be modified to provide a seamless transition between the asset and the model. FIG. 7 is a schematic view of deformed asset 600 positioned partially within model 500 in accordance with some embodiments of the invention. Once pivot point 622 has been positioned on external surface 510 of model 500 at contact point 511 (e.g., as shown in FIG. 6), vertices of base 612 can be projected onto respective projected surface points of external surface 510. For example, as shown in FIG. 7, vertices 624 and 626 can be projected onto external surface 510 at projected surface points 514 and 516 of external surface 510, respectively. In some cases, vertices 624 and 626 can be projected in different directions, for example if the vertices are on opposite sides of external surface 510. Such vertices can be projected along any suitable axis onto surface 510 for defining respective projected surface points. In some embodiments, an axis perpendicular to external surface 510 at contact point 511 may be defined, and the vertices may be projected along that axis (e.g., axis 513 of FIG. 7) onto external surface 510 of model 500. Alternatively, projected surface points 514 and 516, to which respective vertices 624 and 626 may be projected, can be defined as the points on external surface 510 that are nearest to vertices 624 and 626, respectively. When vertices of base 612 of asset 600 are projected onto external surface 510 of model 500, the shape of protrusion 610 within volume 512 can be distorted, which can lead to sharp angles (e.g., 632 and 634) at an interface between protrusion 610 of asset 600 and external surface 510 of model 500.

Figure 8:
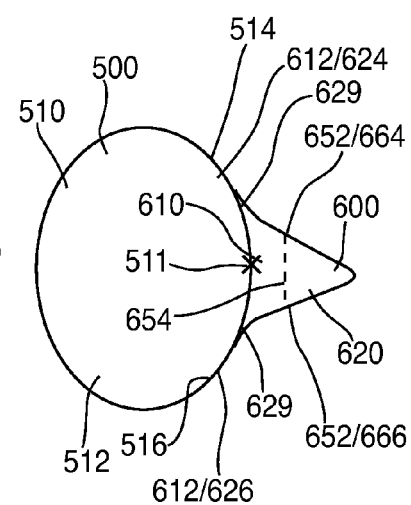
FIG. 8 is a cross-sectional view, similar to FIGS. 5-7, of the asset of FIGS. 5-7 seamlessly integrated with the model of FIGS. 5-7 in accordance with some embodiments of the invention.

To finalize the integration of an asset with a model, portions of an external surface of the asset can be smoothed or otherwise deformed to smoothly transition from the external surface of the asset to an external surface of the model. In some cases, portions of the external surface of the model can instead or in addition be deformed. FIG. 8 is a schematic view of asset 600 seamlessly integrated with model 500 in accordance with some embodiments of the invention. External surface 620 of protrusion 610 of asset 600 can include a deformed region 629, which may be in the vicinity of vertices 624 and 626. In some cases, deformed region 629 can be limited to only a portion of external surface 620 of protrusion 610. In particular, regions of protrusion 610 that are sufficiently distant from model 500, and in particular from external surface 510 of model 500 can remain in their initial shape or configuration. In some cases, asset 600 can include transition points or vertices that may extend around and define a periphery of a transition cross-section of asset 600 through protrusion 610, such that deformed region 629 may extend between the base vertices of base 612 and the transition cross-section of protrusion 610. For example, as shown in FIG. 8, a transition cross-section 654 through protrusion 610 of asset 600 may be defined by a transition boundary 652 that can be a continuous path including many transition vertices (e.g., transition vertices 664 and 666). Deformed region 629 of external surface 620 of asset 600 may extend between the base vertices of base 612 (e.g., base vertices 624 and 626) and the transition vertices of transition boundary 652 (e.g., transition vertices 664 and 666). Transition cross-section 654 and transition boundary 652 can be disposed at any suitable position along protrusion 610 of asset 600 including, for example, at a particular position based on a height of protrusion 610 away from base surface 614, based on the position of pivot point 622 with respect to base surface 614, based on the area of base surface 614, based on the distance of a transition vertex to one or more portions of external surface 510 of model 500, or combinations of these. In some cases, most or all of asset 600 can be deformed by different amounts. For example, the amount of deformation can range between 0% (e.g., not deformed) and 100% (entirely deformed) along protrusion 610, where a vertex of the asset on base surface 614 is entirely deformed, and a point that is the farthest from base surface 614 is not deformed. The amount of deformation can be quantified using any suitable approach including, for example, a deformation factor associated with each point of the asset based on the distance of the point from the base.

Any suitable approach may be used to smooth an external surface of an asset relative to an external surface of a model. In some embodiments, a plane may be identified at each base vertex of base 612 that is tangent to external surface 510 at and/or through that base vertex. Such a plane may be used to define an initial transition angle for deformed region 629 of asset 600 relative to external surface 510 of model 500 at the plane's respective base vertex. For example, a plane may be identified that is tangent to external surface 510 at base vertex 624 (not shown), and that plane may be used to define an initial transition angle for deformed region 629 of external surface 620 of asset 600 at base vertex 624 (i.e., at projected surface point 514 of external model surface 510). Similarly, a plane may be identified that is tangent to external surface 510 at base vertex 626 (not shown), and that plane may be used to define an initial transition angle for deformed region 629 of external surface 620 of asset 600 at base vertex 626 (i.e., at projected surface point 516 of external model surface 510). In addition, a plane may be identified at each transition vertex of transition boundary 652 that is tangent to external surface 620 of asset at and/or through that transition vertex. Such a plane may be used to define an initial transition angle for deformed region 629 of asset 600 relative to external surface 620 of asset 600 at the plane's respective transition vertex. For example, a plane may be identified that is tangent to external surface 620 at transition vertex 664 (not shown), and that plane may be used to define an initial transition angle for deformed region 629 of external surface 620 of asset 600 at transition vertex 664. Similarly, a plane may be identified that is tangent to external surface 620 at transition vertex 666 (not shown), and that plane may be used to define an initial transition angle for deformed region 629 of external surface 620 of asset 600 at transition vertex 666. In addition, a curved line or surface may be defined for connecting the portion of deformed region 629 in the vicinity of each of the base vertices (e.g., base vertices 524 and 526) with the respective portion of deformed region 629 in the vicinity of each of the transition vertices (e.g., transition vertices 664 and 666). Such curved lines or surfaces can be defined, for example, from the vertices and their identified tangent planes. In one implementation, a Bezier curve or a surface constructed using one or more Bezier curves can be defined to create deformed region 629. In another implementation, the deformation can be determined by a deformation factor selected based on the distance of a point on the asset from the base.

Figures 9A, 9B:
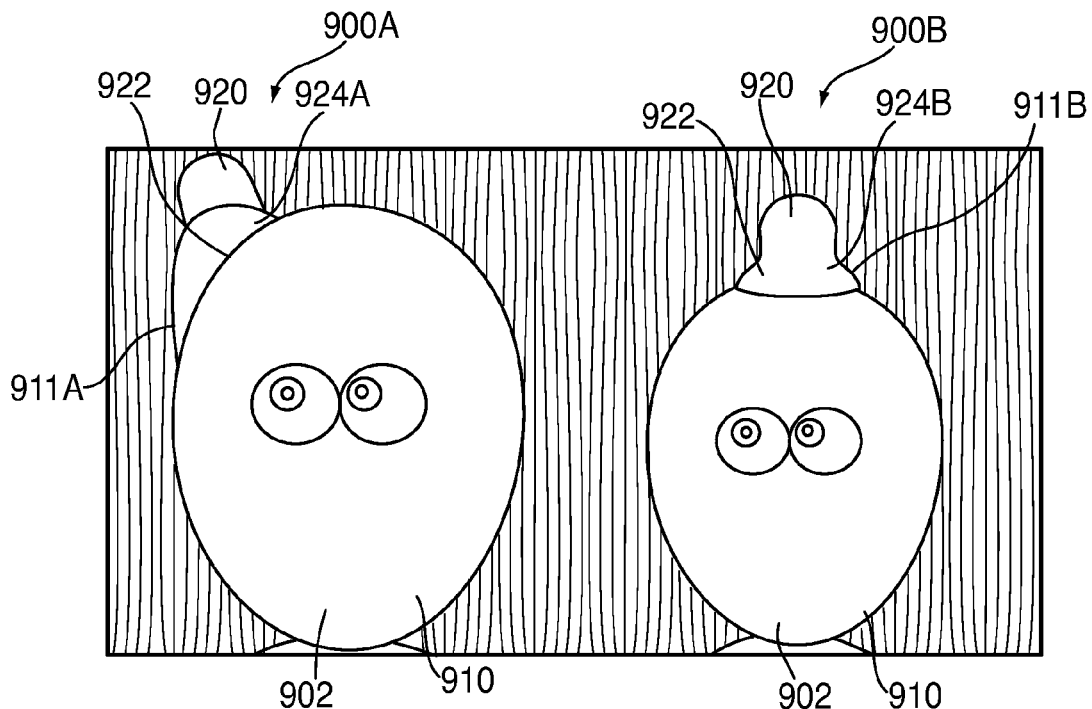
FIGS. 9A-9C are illustrative displays of a three-dimensional asset integrated with a three-dimensional model in accordance with some embodiments of the invention.
Figure 9C:
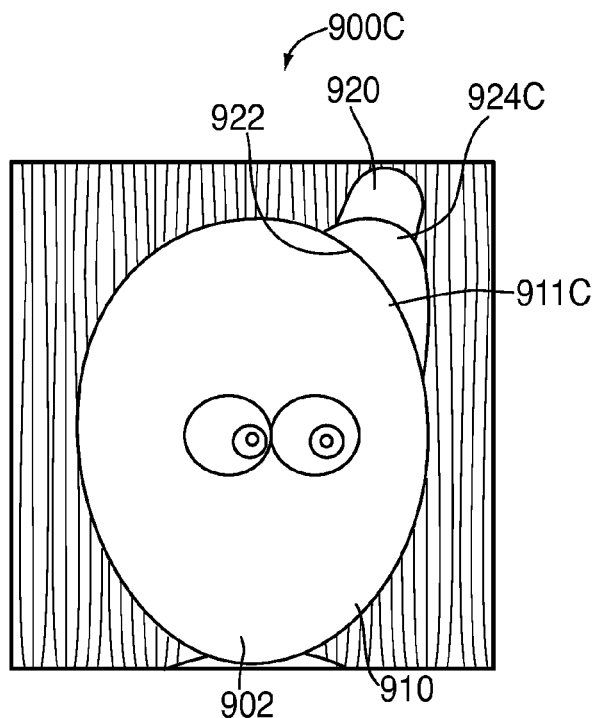

Using this approach can ensure that a model does not include any discontinuities in regions where an asset is integrated with the model. In particular, because base vertices of an asset may be projected on an external surface of a model, the entire base of the asset can be in contact with the surface of the model. For example, FIGS. 9A-9C are illustrative displays 900A-900C, respectively, of an asset integrated with a model in accordance with some embodiments of the invention. Each one of displays 900A-900C can each include a model 902 having a nose asset 920 positioned at respective different regions 911A-911C of model 902. Asset 920 can include a base 922 that can be integrated or merged with an external surface 910 of model 902. To accommodate differences in curvature and shape of external surface 910 at each of the different regions 911A-911C of model 902, a deformed region (e.g., respective deformed regions 924A-924C) of asset 920 can differ in each display. While deformed regions 924A-924C may differ, there may be no discontinuities between asset 920 and external surface 910.

In some cases, a user can select an asset that has already been integrated with a model at a first region of the model, and can move the asset along the external surface of the model to a new region of the model. In such cases, a new contact point on the external surface of the model may be identified for the asset, and the asset may then be integrated with the model at a region associated with the new contact point using one or more of the approaches described above. If a sequence of new contact points is identified (e.g., as the user drags an asset), the asset can be placed at and integrated with the model at each new contact point of the sequence of new contact points.

In some cases, a model can include several assets that are integrated with the model. For example, a model can include a hair asset, a nose asset, one or more ear assets, one or more eye assets, and a mouth asset. As discussed above, a user can move or displace different assets on the surface of a model. To prevent different assets from intersecting or colliding, rules governing the relative position of assets can be provided. For example, some rules can mandate a minimum distance between assets (e.g., between base vertices of different assets, or between pivot points of different assets). These rules can ensure, for example, that a nose asset is not placed over an eye asset. As another example, some rules can mandate a maximum distance between assets. These rules can ensure, for example, that an eye asset and a related eyelash asset remain in proximity to one another, or that a nose asset is placed between eye assets. In some cases, some assets can intersect with other assets. For example, an ear asset can be placed over or within a hair asset.

In addition to assets protruding from an external surface of a model, a model can include assets creating openings or holes in the external surface of the model. FIG. 10 is an exploded view of a "hole" asset 1000 that can be incorporated in a model in accordance with some embodiments of the invention. FIG. 11 is a perspective view of the assembled hole asset 1000 of FIG. 10 in accordance with some embodiments of the invention. Hole asset 1000 can include projection 1020 having exterior surface 1022 and interior surface 1024, where interior surface 1024 can be visible through an opening formed in an external surface of a model with which asset 1000 is integrated. In some cases, interior surface 1024 can define a cavity in which a secondary asset can be placed. Interior surface 1024, which may be visible in a model, can include a texture or color corresponding to particular features of an asset (e.g., texture and color corresponding to a tongue within a mouth asset defined as a hole asset). Hole asset 1000 can include base surface 1030 that may be used to define an opening in the external surface of the model with which asset 1000 is integrated. In particular, base surface 1030 can define a periphery for the opening in the external surface of the model with which asset 1000 is integrated. Base surface 1030 can define several vertices, for example as discussed above with respect to base vertices 624 and 626 of base 612 of base surface 614 of asset 600 of FIGS. 5-8. Hole asset 1000 can include pivot point 1026 for positioning the asset on a model.

A hole asset can be integrated in an external surface of a model using an approach similar to that used for other assets that include protrusions extending from the surface of the model (e.g., protrusion asset 600 of FIGS. 5-8). FIGS. 12A-12C are a sequence of respective illustrative displays 1200A-1200C showing how one or more hole assets 1000 can be integrated with a model 1202 in accordance with some embodiments of the invention. Model 1202 can include external surface 1210. In some cases, model 1202 can include a foundation structure on which several assets can be placed or in which several assets can be integrated. Hole asset 1000 can be placed with respect to model 1200 such that pivot point 1026 of hole asset 1000 can coincide with contact point 1211 on external surface 1210 of model 1200 (e.g., as described above with respect to contact point 511 and pivot point 622 of FIGS. 5-8). Asset 1000 can be oriented such that the portion of asset 1000 extending away from base 1030 (e.g., projection 1020) can extend into model 1202. In other words, external surface 1210 of model 1202 may remain substantially smooth or at least not include features that may increase the size of a profile of external surface 1210. Based on the position of asset pivot point 1026 relative to asset base 1030, at least a portion of base 1030 can be located on external surface 1210 or be external to the volume of model 1202, as shown in display 1200B of FIG. 12B. Alternatively, some or all of base 1030 can be within the volume of model 1202.

Base 1030 can be used to define an opening to be formed in external surface 1210 for hole asset 1000. In particular, one or more base vertices defining base 1030 can be projected onto external surface 1210, for example as described above in connection with projected surface points 514 and 516 of FIGS. 6-8. When the base vertices of hole asset 1000 are projected onto external surface 1210, the projected vertices can define a closed path corresponding to an opening in external surface 1210 for asset 1000.

To allow internal surface 1024 of asset 1000 to be visible through external surface 1210 of model 1202, one or more portions of external surface 1210 within an area enclosed by the projected vertices of base 1030 may be removed. In particular, the portions of external surface 1210 enclosed by the projected vertices of base 1030 can be removed such that inner surface 1024 of asset 1000 may be exposed and visible, and such that an eye asset 1240 can be positioned at hole asset 1000 and can be visible adjacent to at least a portion of exposed asset 1000, as shown in display 1200C of FIG. 12C. In some cases, base 1030 can be removed from model 1202 along with the portions of external surface 1210, for example by clearing a z-buffer used to store information to be displayed.

Figures 13, 14:
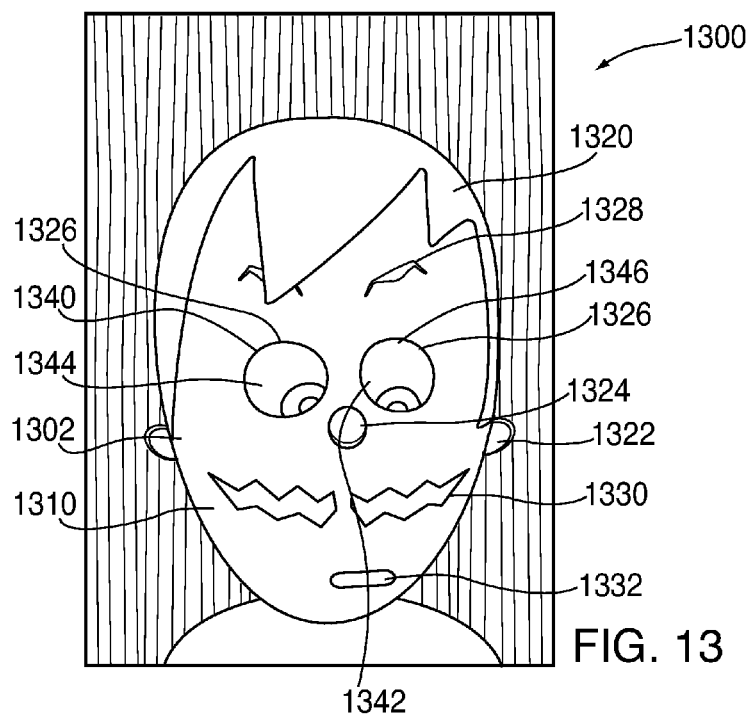
FIG. 13 is an illustrative display of a three-dimensional model integrated with three-dimensional assets in accordance with some embodiments of the invention.
FIG. 14 is another illustrative display of a three-dimensional model integrated with three-dimensional assets in accordance with some embodiments of the invention.

As mentioned with respect to eye asset 1240 of FIG. 12C, a three-dimensional model can include any suitable number of assets that provide a hole in an external surface of the model. In some cases, secondary assets can be placed within a hole asset to enhance a feature of the model. FIGS. 13 and 14 are respective illustrative displays 1300 and 1400 of three-dimensional models having assets providing holes within an external surface of the models in accordance with some embodiments of the invention. Model 1302 shown in display 1300 can include several assets integrated in external surface 1310 of model 1302. For example, model 1302 can include hair asset 1320, one or more ear assets 1322, nose asset 1324, one or more eye assets 1326, one or more eyelash assets 1328, facial hair asset 1330, and mouth asset 1332. Some of the assets can at least partially protrude from surface 1310. For example, hair asset 1302, ear assets 1322, nose asset 1324, eyelash assets 1328, and facial hair asset 1330 can protrude from surface 1310. Other assets can be recessed in external surface 1310 of model 1302. For example, eye assets 1326 and mouth asset 1332 can extend into external surface 1310 of model 1302.

In some cases, eye assets 1326 can be constructed by combining several sub-assets. For example, eye assets 1326 can include hole assets 1340 and 1342 in which individual eyeball assets 1344 and 1346 can be placed. When a user selects eye asset 1326 to integrate into model 1302, eyeball asset 1344 can be positioned into a cavity formed by hole asset 1340, and hole asset 1340, with eyeball asset 1344, can be positioned in external surface 1310 of model 1302. In some cases, eyeball assets 1344 and 1346 can be moved within hole assets 1340 and 1342, respectively.

In some cases, mouth asset 1332 can include features incorporated within a cavity defining the mouth. For example, an interior surface of mouth asset 1332 can include a texture or color corresponding to elements within a mouth. In particular, an interior surface of mouth asset 1332 can include several colors depicting a tongue and inner cheeks. In some cases, the interior surface of mouth asset 1332 can include colors depicting teeth. Alternatively, mouth asset 1332 can include one or more secondary assets placed within the cavity of mouth asset 1332 to depict elements of the mouth. For example, mouth asset 1332 can include a protrusion asset corresponding to a tongue. In some cases, a secondary asset can move within the cavity of mouth asset 1332.

Not all hole assets can include a colored inner surface or a secondary asset disposed within a cavity defined by the hole asset, as shown in model 1302. For example, model 1402 shown in display 1400 of FIG. 14 can include hole asset 1420 incorporated in external surface 1410 of model 1402. In particular, model 1402 can include some or all of the assets described above in connection with model 1302, as well as hole asset 1420 located on a forehead region of model 1402. Hole asset 1420 can define cavity 1422 having exposed interior surface 1424. As discussed above, a user can displace hole asset 1420 with respect to any region of model 1402. In some cases, asset 1420, model 1402, or other assets of model 1402 can include rules specifying relative positions of the assets integrated with model 1402.

Once an asset is integrated with a model, an external surface of the model can seamlessly transition to an external or exposed surface of the asset. For example, an external surface of model 1402 can seamlessly transfer from external surface 1410 to interior surface 1424 of asset 1420. To determine how to position further assets on the model, the electronic device can use the external or exposed surfaces of an integrated asset instead the portions of the external surface of the model that were replaced by the integrated asset. In such cases, external or exposed surfaces of an asset can be considered to be part of the external surface of the model. This approach may be particularly desirable for positioning secondary asset (e.g., eyeball assets) in a model.

Figure 15:
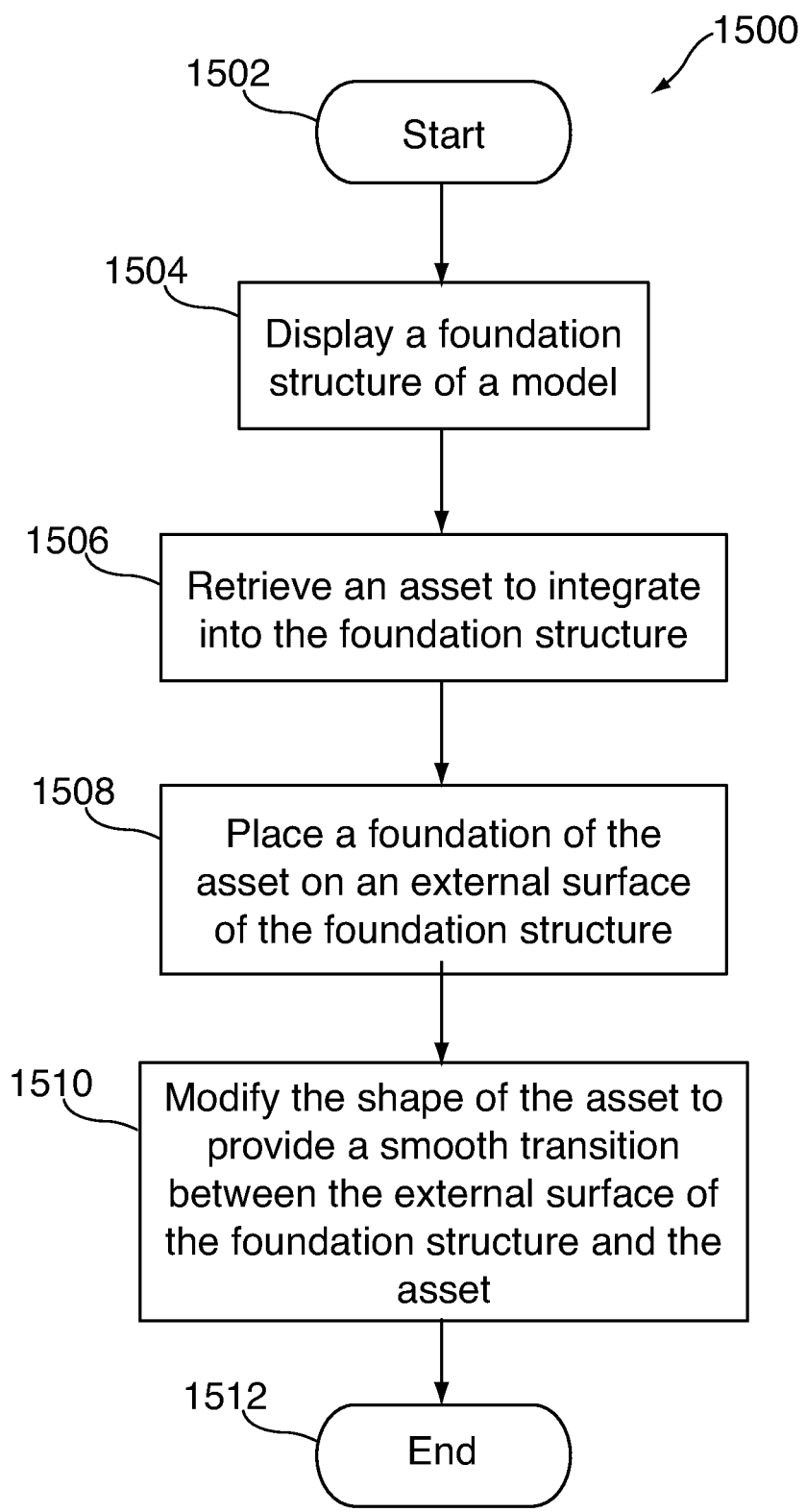
FIG. 15 is a flowchart of an illustrative process for integrating an asset with a three-dimensional model in accordance with some embodiments of the invention.

FIG. 15 is a flowchart of an illustrative process 1500 for integrating a three-dimensional asset with a three-dimensional model in accordance with some embodiments of the invention. Process 1500 can begin at step 1502. At step 1504, a three-dimensional foundation structure of a model can be displayed, for example by an electronic device. The foundation structure can include a three-dimensional object having an external surface. At step 1506, a three-dimensional asset to integrate with the foundation structure can be retrieved. For example, a user can select a particular asset to integrate into an external surface of the model. At step 1508, a base of the asset can be placed on an external surface of the foundation structure. For example, one or more vertices defining a base of the asset can be projected onto the external surface of the foundation structure at one or more respective projected surface points. In some cases, the projected surface points can be based on an input provided by a user. At step 1510, a shape of the asset can be modified to provide a smooth transition between the asset and the external surface of the foundation structure. For example, an electronic device can modify a region of an external surface of the asset to provide a smooth surface at an interface between the external surface of the foundation structure and the external surface of the asset. Process 1500 can then end at step 1512.

Figure 16:
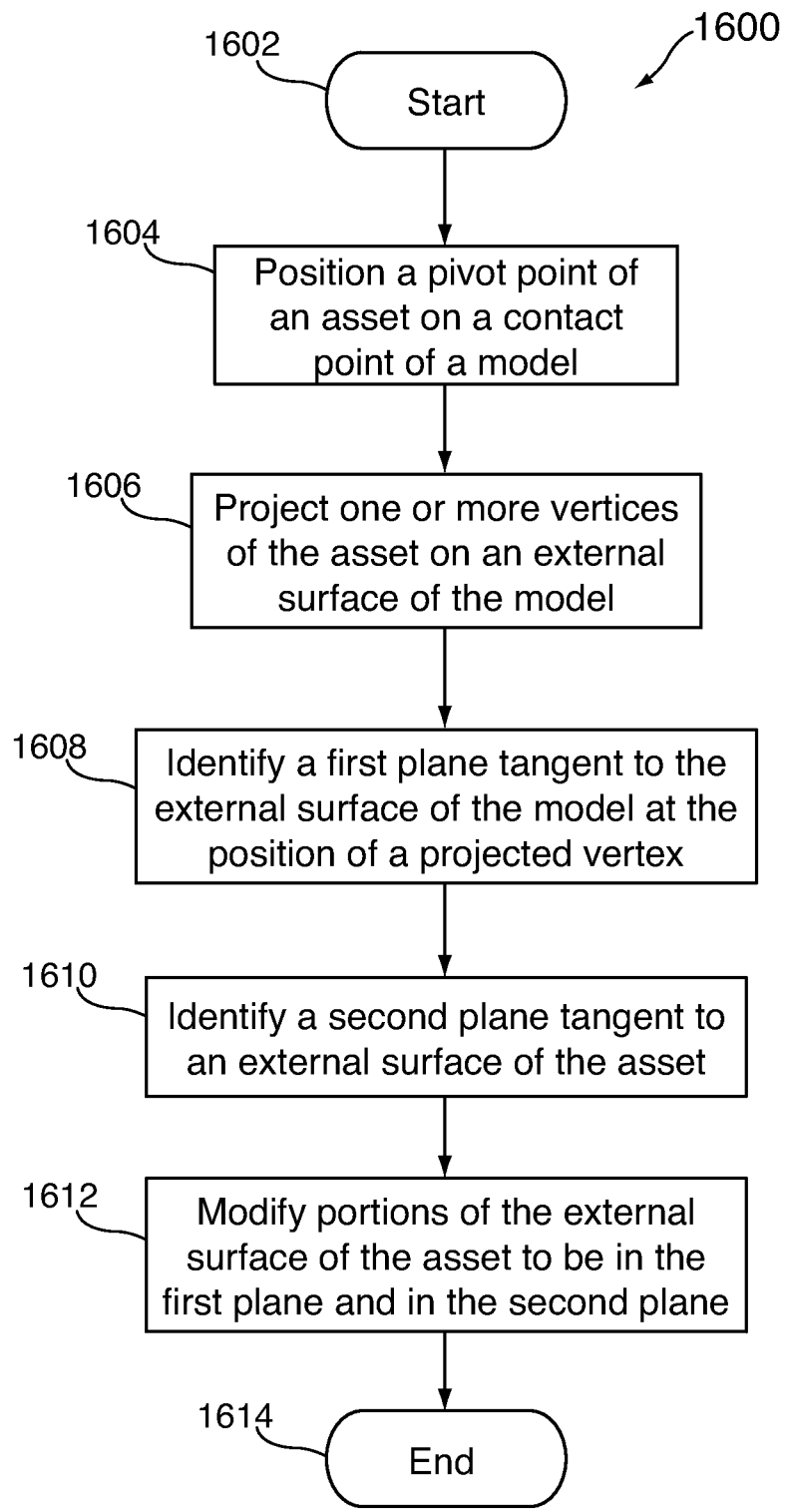
FIG. 16 is a flowchart of an illustrative process for providing a smooth transition between an external surface of an asset and an external surface of a model in accordance with some embodiments of the invention.

FIG. 16 is a flowchart of an illustrative process 1600 for providing a smooth transition between an external surface of an asset and an external surface of a model with which the asset is integrated in accordance with some embodiments of the invention. Process 1600 can begin at step 1602. At step 1604, an asset can be positioned on a model such that a pivot point of the asset may coincide with a contact point on an external surface of the model. For example, an electronic device can display a model and an asset. At step 1606, one or more vertices of the asset can be projected on the external surface of the model. For example, several vertices corresponding to a base of the asset can be projected onto the external surface of the model. In some cases, the vertices can define a closed path. At step 1608, a first plane that is tangent to the external surface of the model and that passes through a projected vertex of the model on the surface of the model can be identified. For example, an electronic device can identify, for each projected vertex of the asset, a plane tangent to the external surface of the model at that projected vertex. At step 1610, a second plane tangent to an external surface of the asset can be identified. For example, an electronic device can identify one or more transition vertices on the external surface of the asset, where the transition vertices define a boundary for a transition region of the asset that can deform to integrate the asset with the model. The electronic device can then identify a second plane that is tangent to the external surface of the asset and that passes through a respective transition point. At step 1612, the asset can be modified, smoothed, re-defined, or otherwise deformed such that one or more portions of the external surface of the asset can be in one of the identified first planes and/or in one of the identified second places. For example, an electronic device can deform a region of the external surface of the asset such that a portion of the region that is in the vicinity of a base vertex is initially in one of the identified first planes, and a portion of the region that is in the vicinity of a transition vertex is initially in one of the identified second planes. The electronic device can also define a curved line or surface that may extend between one of the identified first planes and one of the identified second planes. Process 1600 can then end at step 1614.

Figure 17:
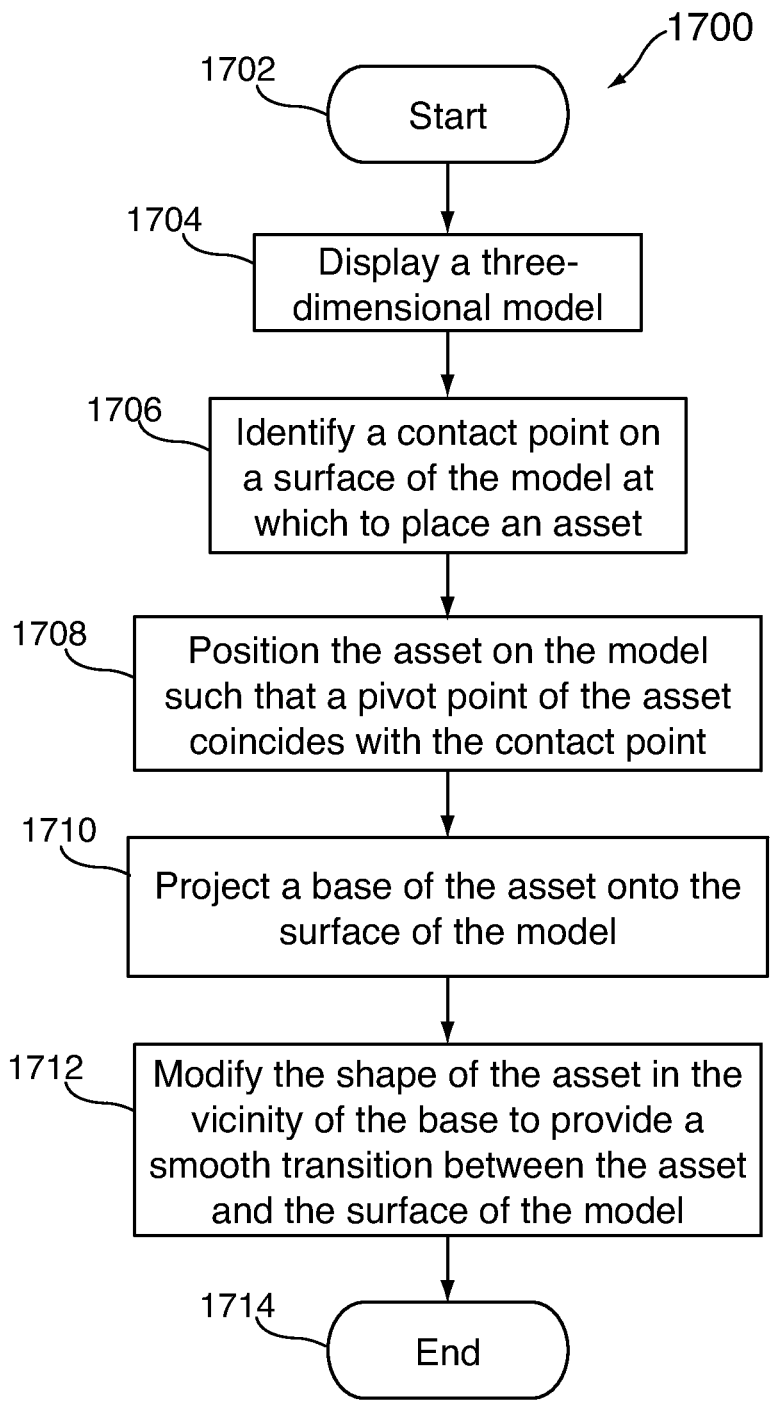
FIG. 17 is a flowchart of an illustrative process for integrating an asset with a three-dimensional model in accordance with some embodiments of the invention.

FIG. 17 is a flowchart of an illustrative process 1700 for integrating an asset on a three-dimensional model in accordance with some embodiments of the invention. Process 1700 can begin at step 1702. At step 1704, a three-dimensional model can be displayed. For example, an electronic device can display a three-dimensional model. The model can include an external surface enclosing a volume. At step 1706, a contact point on the external surface of the model at which to place the asset can be identified. For example, an electronic device can identify a contact point corresponding to an input provided by a user. At step 1708, the asset can be positioned on the model such that a pivot point of the asset coincides with the identified contact point of the model. At step 1710, a base of the asset can be projected onto the external surface of the model. For example, an electronic device can identify one or more vertices corresponding to a base periphery of a base surface of the asset, and can project the identified vertices onto the external surface of the model. At step 1712, the shape of the asset can be smoothed, deformed, re-defined, or otherwise modified in the vicinity of the projected base to provide a smooth transition between the asset and the external surface of the model. For example, a region of an external surface of the asset can be redrawn such that the asset is seamlessly integrated with the external surface of the model. Process 1700 can then end at step 1714.

Figure 18:
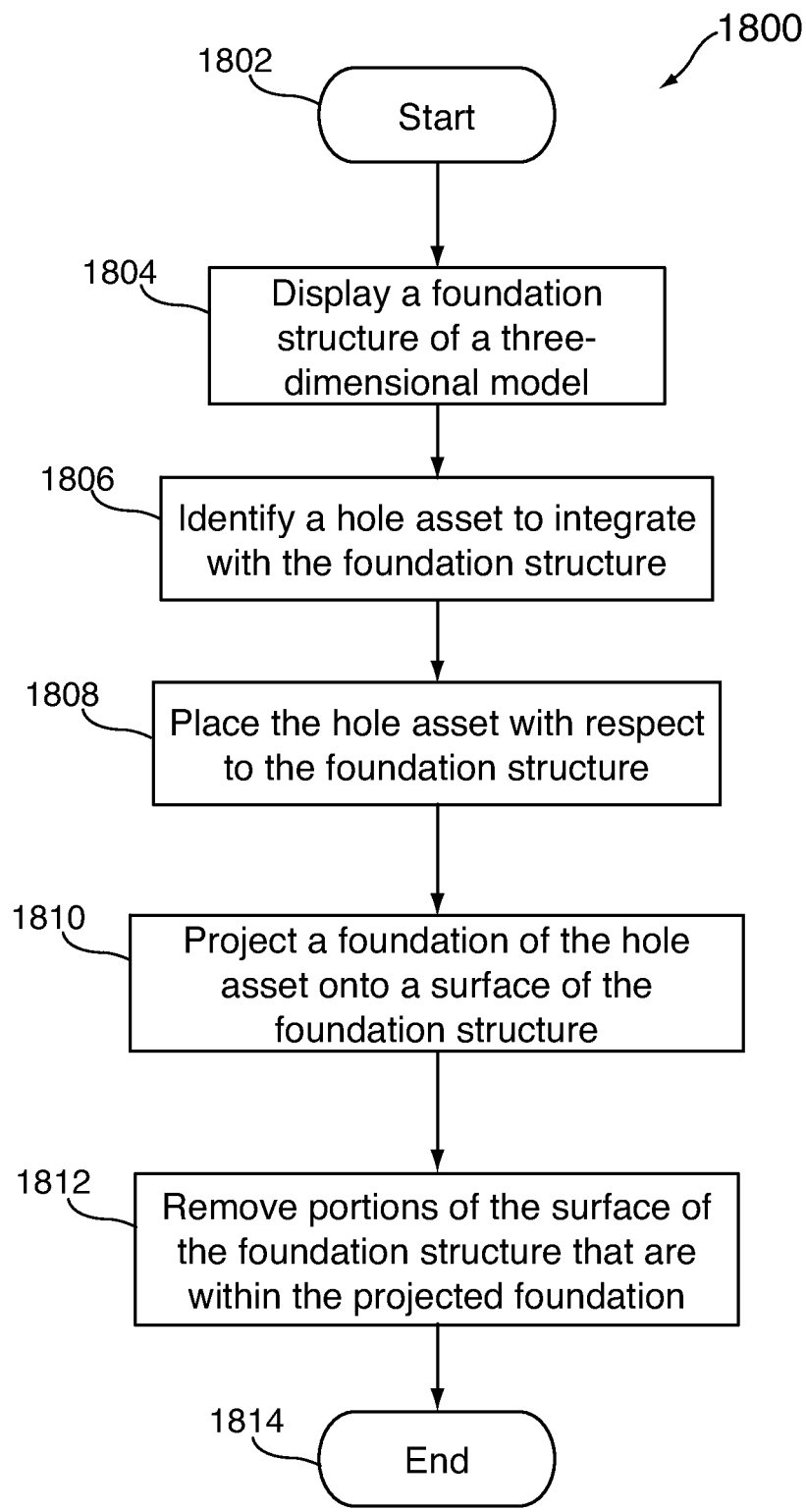
FIG. 18 is a flowchart of an illustrative process for integrating a three-dimensional hole asset with a three-dimensional model in accordance with some embodiments of the invention.

FIG. 18 is a flowchart of an illustrative process 1800 for integrating a hole asset with a three-dimensional model in accordance with some embodiments of the invention. Process 1800 can begin at step 1802. At step 1804, a foundation structure of a three-dimensional model can be displayed. For example, an electronic device can display a foundation structure with which one or more assets can be integrated. The foundation structure can include an external surface, for example enclosing a volume of the foundation structure. At step 1806, a hole asset to integrate with the foundation structure can be identified. For example, an electronic device can identify a hole asset selected by a user to incorporate into the model. The hole asset can include an internal surface corresponding to a cavity, and a base defining an opening for the cavity of the hole asset. At step 1808, the hole asset can be placed with respect to the foundation structure. In some cases, a portion of the cavity can extend through the external surface of the foundation structure. At step 1810, the base can be projected onto the external surface of the foundation structure. At step 1812, portions of the external surface of the foundation structure that are within an area enclosed by the projected base can be removed from the displayed model. In particular, portions of the external surface can be removed from an electronic device display such that the interior surface of the cavity of the hole asset may be visible along the external surface of the model (e.g., through the area of the removed portions of the external surface of the foundation structure). Process 1800 can then end at step 1814.

Figure 19:
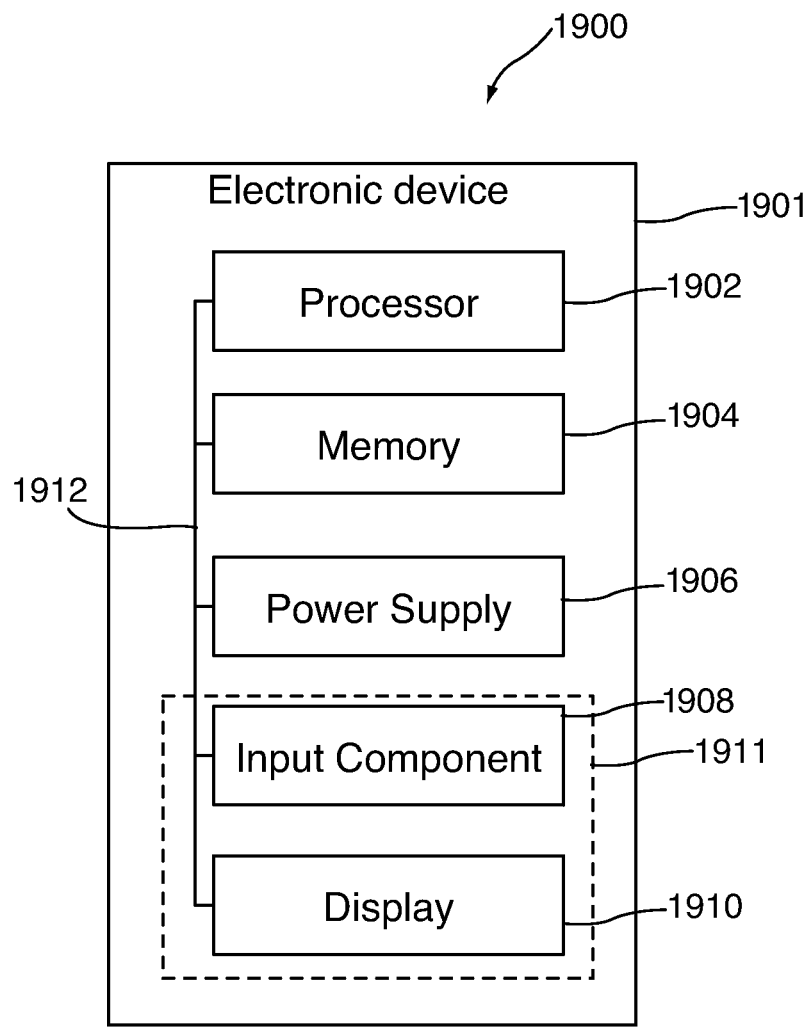
FIG. 19 is a schematic view of an illustrative electronic device for displaying a three-dimensional model in accordance with some embodiments of the invention.

Any suitable electronic device can be used to integrate a three-dimensional asset with a three-dimensional model. FIG. 19 is a schematic view of an illustrative electronic device 1900 for displaying a three-dimensional model (e.g., an avatar) to a user in accordance with some embodiments of the invention. Electronic device 1900 may be any portable, mobile, or hand-held electronic device configured to present a three-dimensional model and/or a three-dimensional asset to a user wherever the user travels. Alternatively, electronic device 1900 may not be portable at all, but may instead be generally stationary. Electronic device 1900 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 1900 may perform a single function (e.g., a device dedicated to presenting visual content) and, in other embodiments, electronic device 1900 may perform multiple functions (e.g., a device that presents visual content, plays music, and receives and transmits telephone calls).

Electronic device 1900 may include a processor 1902, memory 1904, power supply 1906, input component 1908, and display 1910. Electronic device 1900 may also include a bus 1912 that may provide one or more wired or wireless communication links or paths for transferring data and/or power to, from, or between various other components of device 1900. In some embodiments, one or more components of electronic device 1900 may be combined or omitted. Moreover, electronic device 1900 may include other components not combined or included in FIG. 19 and/or several instances of one or more of the components shown in FIG. 19.

Memory 1904 may include one or more storage mediums, including for example, a hard-drive, flash memory, non-volatile memory, permanent memory such as read-only memory ("ROM"), semi-permanent memory such as random access memory ("RAM"), any other suitable type of storage component, or any combination thereof. Memory 1904 may include cache memory, which may be one or more different types of memory used for temporarily storing data for electronic device application programs. Memory 1904 may store media data (e.g., music and image files), software (e.g., a boot loader program, one or more application programs of an operating system for implementing functions on device 1900, etc.), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 1900 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Power supply 1906 may provide power to one or more of the components of device 1900. In some embodiments, power supply 1906 can be coupled to a power grid (e.g., when device 1900 is not a portable device, such as a desktop computer). In some embodiments, power supply 1906 can include one or more batteries for providing power (e.g., when device 1900 is a portable device, such as a cellular telephone). As another example, power supply 1906 can be configured to generate power from a natural source (e.g., solar power using solar cells).

One or more input components 1908 may be provided to permit a user to interact or interface with device 1900. For example, input component 1908 can take a variety of forms, including, but not limited to, an electronic device pad, dial, click wheel, scroll wheel, touch screen, one or more buttons (e.g., a keyboard), mouse, joy stick, track ball, microphone, camera, proximity sensor, light detector, and combinations thereof. Each input component 1908 can be configured to provide one or more dedicated control functions for making selections or issuing commands associated with operating device 1900.

Electronic device 1900 may also include one or more output components that may present information (e.g., visual, audible, and/or tactile information) to a user of device 1900. An output component of electronic device 1900 may take various forms, including, but not limited to, audio speakers, headphones, audio line-outs, visual displays, antennas, infrared ports, rumblers, vibrators, or combinations thereof.

For example, electronic device 1900 may include display 1910 as an output component. Display 1910 may include any suitable type of display or interface for presenting visual content to a user. In some embodiments, display 1910 may include a display embedded in device 1900 or coupled to device 1900 (e.g., a removable display). Display 1910 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 1910 can include a movable display or a projecting system for providing a display of content on a surface remote from electronic device 1900, such as, for example, a video projector, a head-up display, or a three-dimensional (e.g., holographic) display. As another example, display 1910 may include a digital or mechanical viewfinder, such as a viewfinder of the type found in compact digital cameras, reflex cameras, or any other suitable still or video camera. In some embodiments, display 1910 may include display driver circuitry, circuitry for driving display drivers, or both. Display 1910 can be operative to present visual content provided by device 1900 (e.g., an avatar constructed from several assets).

It should be noted that one or more input components and one or more output components may sometimes be referred to collectively herein as an input/output ("I/O") interface (e.g., input component 1908 and display 1910 as I/O interface 1911). It should also be noted that input component 1908 and display 1910 may sometimes be a single I/O component, such as a touch screen that may receive input information through a user's touch of a display screen and that may also provide visual information to a user via that same display screen.

Electronic device 1900 may also be provided with an enclosure or housing 1901 that may at least partially enclose one or more of the components of device 1900 for protecting them from debris and other degrading forces external to device 1900. In some embodiments, one or more of the components may be provided within its own housing (e.g., input component 1908 may be an independent keyboard or mouse within its own housing that may wirelessly or through a wire communicate with processor 1902, which may be provided within its own housing).

Processor 1902 of device 1900 may include any processing or control circuitry operative to control the operations and performance of one or more components of electronic device 1900. For example, processor 1902 may be used to run operating system applications, firmware applications, media playback applications, media editing applications, or any other application. In some embodiments, processor 1902 may receive input signals from input component 1908 and/or drive output signals through display 1910.

It is to be understood that the steps shown in each one of processes 1500-1800 of FIGS. 15-18, respectively, are merely illustrative and that existing steps may be modified or omitted, additional steps may be added, and the order of certain steps may be altered.

Moreover, the processes described with respect to FIGS. 15-18, as well as any other aspects of the invention, may each be implemented in hardware or a combination of hardware and software. Embodiments of the invention can also be embodied as computer readable code on a computer-readable medium. The computer-readable medium may be any data storage device that can store data which can thereafter be read by a computer system. Examples of the computer-readable medium include read-only memory ("ROM"), random-access memory ("RAM"), CD-ROMs, DVDs, magnetic tape, and optical data storage devices. The computer-readable medium can also be distributed over network-coupled computer systems so that the computer-readable code may be stored and executed in a distributed fashion.

Although many of the embodiments of the invention are described herein with respect to personal computing devices, it should be understood that the invention is not limited to personal computing applications, but is generally applicable to other applications.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for integrating an asset with a three-dimensional model, wherein the asset comprises a pivot point and a base, and wherein the model comprises a surface, the method comprising:
    displaying the three-dimensional model;
    identifying a contact point on the surface of the model at which to place the asset;
    identifying at least one plane tangent to the surface of the model at the contact point of the surface of the model on which the base is projected;
    positioning the asset on the model such that the pivot point of the asset coincides with the identified contact point;
    modifying the shape of the asset such that a region of the shape of the asset in the vicinity of the projected base is in the identified at least one plane;
    projecting the base onto the surface of the model; and
    modifying a shape of the asset in the vicinity of the base to provide a smooth transition between the asset and the surface of the model;
    wherein the base of the asset is initially enclosed within the model when the asset is positioned prior to projecting the base onto the surface of the model.

2. The method of claim 1, further comprising:
    identifying a vertex in the base; and
    projecting the vertex onto the surface of the model.

3. The method of claim 1, wherein:
    a periphery of the base defines a closed path.

4. The method of claim 3, further comprising:
    identifying a sequence of vertices on the path; and
    projecting each vertex of the sequence of vertices on the external surface of the model.

5. The method of claim 4, further comprising:
    removing portions of the surface of the model enclosed within the closed path to expose a portion of the asset.

6. The method of claim 5, wherein the asset comprises a cavity visible through the surface of the model.

7. The method for integrating an asset with a three-dimensional model of claim 1, further comprising:
    integrating a second asset with the three-dimensional model at a position other than the contact point;
    wherein the position of the second asset is limited by a rule mandating a minimum distance between the asset and the second asset.

8. The method for integrating an asset with a three-dimensional model of claim 7, wherein the rule includes at least one of: a minimum distance between the pivot point of the asset and a second pivot point of the second asset.

9. An electronic device comprising:
    an input interface;
    a display; and
    control circuitry coupled to the input interface and the display, wherein the control circuitry is operative to:
        direct the display to display an avatar;
        receive from the input interface of a selection of an asset to integrate with an external surface of the avatar, wherein the asset comprises a protrusion extending from a base;
        identify a contact point on the surface of the avatar at which to place the asset;
        identify at least one plane tangent to the surface of the avatar at the contact point of the surface of the avatar;
        position the asset such that the base is enclosed within a volume of the avatar at the contact point;
        project the base onto the external surface of the avatar;
        modify the shape of the protrusion in the vicinity of the projected base to provide a seamless transition between the external surface of the avatar and the protrusion; and
        integrate a second asset with the three-dimensional model at a position other than the contact point;
        wherein the position of the second asset is limited by a rule governing a relative position between the asset and the second asset.

10. The electronic device of claim 9, wherein the control circuitry is further operative to:
    position the asset such that a pivot point of the asset coincides with a contact point on the external surface of the avatar.

11. The electronic device of claim 9, wherein the control circuitry is further operative to:
    receive, from the input interface, an instruction to move the asset;
    project the base onto a new region of the external surface of the avatar; and
    modify the shape of the protrusion in the vicinity of the projected base based on a curvature of the new region of the external surface of the avatar.

12. The electronic device of claim 11, wherein the modified shape of the protrusion provides a seamless transition with the new region of the external surface.

13. The electronic device of claim 9,
    wherein the position of the second asset is limited by a rule mandating a minimum distance between the asset and the second asset.

14. A non-transitory computer-readable medium for integrating an asset with a three-dimensional model, wherein the asset comprises a pivot point and a base, and wherein the model comprises a surface, wherein the non-transitory computer-readable medium comprising computer program logic recorded thereon for:
    displaying the three-dimensional model;
    identifying a contact point on the surface of the model at which to place the asset;
    identifying at least one plane tangent to the surface of the model at the contact point of the surface of the model on which the base is projected;
    positioning the asset on the model such that the pivot point of the asset coincides with the identified contact point;
    modifying the shape of the asset such that a region of the shape of the asset in the vicinity of the projected base is in the identified at least one plane;
    projecting the base onto the surface of the model; and
    modifying a shape of the asset in the vicinity of the base to provide a smooth transition between the asset and the surface of the model;

wherein the base of the asset is initially enclosed within the model when the asset is positioned prior to projecting the base onto the surface of the model.

15. The non-transitory computer-readable medium for integrating an asset with a three-dimensional model of claim 14, further comprising logic recorded thereon for:
    integrating a second asset with a three-dimensional model at a position other than the contact point;
    wherein the position of the second asset is limited by a rule mandating a minimum distance between the asset and the second asset.

16. The non-transitory computer-readable medium of claim 15, wherein the rule includes at least one of: a minimum distance between the pivot point of the asset and a second pivot point of the second asset.

* * * * *